United States Patent
Huang et al.

(10) Patent No.: US 7,464,084 B2
(45) Date of Patent: Dec. 9, 2008

(54) METHOD FOR PERFORMING AN INEXACT QUERY TRANSFORMATION IN A HETEROGENEOUS ENVIRONMENT

(75) Inventors: Lan Huang, Milpitas, CA (US); Eileen Tien Lin, San Jose, CA (US); Tina Louise Mukai, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 11/342,465

(22) Filed: Jan. 30, 2006

(65) Prior Publication Data

US 2007/0179941 A1 Aug. 2, 2007

(51) Int. Cl.
G06F 17/30 (2006.01)

(52) U.S. Cl. .................................. 707/4; 707/1; 707/2

(58) Field of Classification Search .................. None
See application file for complete search history.

(56) References Cited

U.S. PATENT DOCUMENTS

| | | | |
|---|---|---|---|
| 4,422,158 A * | 12/1983 | Galie | 707/5 |
| 5,544,355 A | 8/1996 | Chaudhuri et al. | |
| 5,548,755 A | 8/1996 | Leung et al. | |
| 5,590,321 A | 12/1996 | Lin et al. | |
| 5,590,324 A | 12/1996 | Leung et al. | |
| 5,797,136 A | 8/1998 | Boyer et al. | |
| 5,826,077 A | 10/1998 | Blakeley et al. | |
| 5,864,840 A | 1/1999 | Leung et al. | |
| 5,943,666 A | 8/1999 | Kleewein et al. | |
| 6,032,143 A | 2/2000 | Leung et al. | |
| 6,088,524 A | 7/2000 | Levy et al. | |
| 6,122,627 A | 9/2000 | Carey et al. | |
| 6,134,540 A | 10/2000 | Carey et al. | |
| 6,199,063 B1 | 3/2001 | Colby et al. | |
| 6,226,637 B1 | 5/2001 | Carey et al. | |
| 6,275,818 B1 | 8/2001 | Subramanian et al. | |
| 6,285,997 B1 | 9/2001 | Carey et al. | |
| 6,334,128 B1 | 12/2001 | Norcott et al. | |
| 6,381,616 B1 | 4/2002 | Larson et al. | |
| 6,526,403 B1 | 2/2003 | Lin et al. | |
| 6,571,233 B2 | 5/2003 | Beavin et al. | |

(Continued)

OTHER PUBLICATIONS

Du, W., R. Krishnamurthy, and M. Shan, "Query Optimization in Heterogeneous DBMS", Proceedings of the 18th VLDB Conference, 1992, pp. 277-291.

(Continued)

Primary Examiner—Khanh B. Pham
Assistant Examiner—Mohammad N Rahman
(74) Attorney, Agent, or Firm—Tamaki K. Davda; Konrad Raynes & Victor LLP

(57) ABSTRACT

An inexact query transformation system selects a query element from a query statement. If an inexact transformation improves the query performance, the system prioritizes the candidate transformation rules applicable to the selected query element. The system applies the candidate transformation rules to the selected query element to generate a transformed query element that includes a transformed remote query element. If the transformed remote query element is pushdownable, the system adds the transformed remote query element to a transformed inexact query output. Otherwise, the system applies additional candidate transformation rules to the selected query element to generate the transformed inexact query output. The system applies the transformed inexact query output to a heterogeneous datastore to provide an output query result.

4 Claims, 5 Drawing Sheets

U.S. PATENT DOCUMENTS

| | | | |
|---|---|---|---|
| 6,615,203 B1 * | 9/2003 | Lin et al. | 707/3 |
| 6,684,250 B2 * | 1/2004 | Anderson et al. | 709/225 |
| 6,704,726 B1 | 3/2004 | Amouroux | |
| 6,748,377 B1 | 6/2004 | Attaluri | |
| 7,107,263 B2 * | 9/2006 | Yianilos et al. | 707/3 |
| 7,158,989 B2 * | 1/2007 | Saltz | 707/102 |
| 2002/0133504 A1 | 9/2002 | Vlahos et al. | |
| 2005/0038782 A1 | 2/2005 | Styles et al. | |

OTHER PUBLICATIONS

Gassner, P., G.M. Lohman, K.B. Schiefer, Y. Wang, "Query Optimization in the IBM DB2 Family", Data Engineering Bulletin, vol. 16, No. 4, 1994, pp. 0-13.

Haas, L.M., D. Kossmann, E.L. Wimmers, and J. Yang, "Optimizing Queries Across Diverse Data Sources", Proceedings of the 23rd International Conference on Very Large Data Bases, 1997, pp. 1-25.

Information Builders, "EDA Servers", [online], retrieved from the Internet at <URL: http://www.ibi.com/products/eda/server.htm>, cited on U.S. Patent No. 6,526,403 issued on Feb. 25, 2003 and U.S. Patent No. 6,615,203 issued on Sep. 2, 2003, 10 pp.

Microsoft Corp, "Optimizing Distributed Queries", SQL Server 7.0 Query Processor White Paper, © 1998, 2 pp.

Oracle Corporation, "Oracle7 Server Concepts Manual", [online], © 1996, retrieved from the Internet at <URL: http://teku.pspt.fi/~jkajala/oradoc/DOC/server/doc/SCN73/ch13.html>, 15 pp.

Oracle Corporation, "Oracle8i Distributed Data Access and Oracle Transparent Gateway", Features Overview, Feb. 1999, pp. 1-4.

Oracle Corporation, "Oracle8i Distributed Database Systems-Release 8.1.5", [online], [retrieved on Apr. 22, 1999], retrieved from the Internet at <URL: http://technet.oracle.com/doc/server.815/a67784/ds_ch1.htm>, Chapters 1 & 5, 25 pp.

Pirahesh, H., J.M. Hellerstein, and W.Hasan, "Extensible/Rule Based Query Rewrite Optimization in Starburst", Proceedings of the 1992 ACM SIGMOD International Conference on Management of Data, 1992, pp. 39-48.

de Ferreira Rezende, F., and Hergula, "The Heterogeneity Problem and Middleware Technology: Experiences with and Performance of Database Gateways", Proceedings of the 24rd International Conference on Very Large Data Bases, 1998, 12 pp.

Josifovski, V., P. Schwarz, L. Haas, and E. Lin, "Garlic: A New Flavor of Federated Query Processing for DB2", Proceedings of the 2002 ACM SIGMOD International Conference on Management of Data, Jun. 2002, pp. 524-532.

* cited by examiner

METHOD FOR PERFORMING AN INEXACT QUERY TRANSFORMATION IN A HETEROGENEOUS ENVIRONMENT

FIELD OF THE INVENTION

The present invention generally relates to the field of database management systems, and particularly to querying the databases of the database management system. More specifically, this invention relates to a query transformation technique to achieve more efficient query processing of systems with varying query capabilities within a federated system.

BACKGROUND OF THE INVENTION

For many years, businesses have used computers to manage information such as numbers and text, primarily in the form of coded data. However, business data represents only a small portion of the world's information. As storage, communication, and information processing technologies advance and the cost of these technologies decrease, it becomes more feasible to digitize and store large volumes of other various types of data. Once digitized and stored, the data is required to be available for distribution on demand to users at their place of business, home, or other locations.

New digitization techniques have emerged in the last decade to digitize images, audio, and video, giving rise to a new type of digital information. These digital objects are significantly different from the business data that computers managed in the past, often requiring more advanced information system infrastructures with new capabilities, such as "digital libraries" or content management systems.

New digital technologies can do much more than replace physical objects with their electronic representations. These technologies enable instant access to information; support fast, accurate, and powerful search mechanisms; provide new "experiential" (i.e., virtual reality) user interfaces; and implement new ways of protecting the rights of information owners. These properties make digital library solutions attractive and acceptable to corporate information service organizations as well as to the information owners, publishers, and service providers.

Generally, business data is created by a business process, such as an airline ticket reservation, a deposit at a bank, or a claim processing at an insurance company. Most of these processes have been automated by computers and produce business data in digital form such as text and numbers, i.e., structured coded data. In contrast, the use of digital data is not fully predictable. Consequently, digital data cannot be fully pre-structured because it is the creative result of a human being or it is the digitization of an object of the real world such as, for example, x-rays or geophysical mapping, rather than a computer algorithm. While the present invention is described for example purpose in terms of digital data, it should be clear that the present invention is not limited to digital data.

The average size of business data in digital form is relatively small. A banking record that comprises a customer's name, address, phone number, account number, balance, etc., and may represent only a few hundred characters and a few hundreds or thousands of bits. The digitization of digital information such as image, audio, or video produces a large set of bits called an "object" or binary large objects ("blobs"). For example, a digitized image may take as much as 30 MB of storage. The digitization of a movie, even after compression, may take as much as 3 GB to 4 GB of storage.

Digital information is typically stored as much larger objects, ever increasing in quantity and therefore requiring special storage mechanisms. Conventional business computer systems have not been designed to directly store such large objects. Specialized storage technologies may be required for certain types of information such as media streamers for video or music. Because certain digital information needs to be preserved or archived, special storage management functions are required for providing automated backup and migration to new storage technologies as they become available and as old technologies become obsolete.

For performance reasons, digital data is often placed in the proximity of the users with the system supporting multiple distributed object servers. Consequently, a logical separation between applications, indices, and data is required to ensure independence from any changes in the location of the data.

The indexing of business data is often embedded into the data itself. When the automated business process stores a person's name in the column "NAME", it actually indexes that information. Digital information objects usually do not contain indexing information. Developers or librarians typically create this "meta data" or "metadata". The indexing information for information is typically kept in standard business-like databases separated from the physical object.

In a digital library or a content management system, the digital object can be linked with the associated indexing information since both are available in digital form. Integration of this legacy catalog information with the digitized object is one of the advantages of content management or digital library technology. Different types of objects can be categorized differently as appropriate for each object type. Existing standards such as, for example, MARC records for libraries or Finding Aids for archiving of special collections can be used when appropriate.

The indexing information used for catalog searches in physical libraries is typically the name of the book, author, title, publisher, ISBN, etc., enriched by other information created by librarians. This other information may comprise abstracts, subjects, keywords, etc. In contrast, digital libraries may contain the entire content of books, images, music, films, etc.

Technologies are desired for full text searching, image content searching (searching based on color, texture, shape, etc.), video content searching, and audio content searching. A specialized search engine usually conducts each type of search. The integrated combination of catalog searches, for example, using SQL in conjunction with content searches provides powerful search and access functions. These technologies can also be used to partially automate further indexing, classification, and abstracting of objects based on content. The term multi-search refers to searches employing more than one search engine, for example text and image search.

To harness the massive amounts of information spread throughout these many networks of varying types of content, a user desires to be able to simultaneously search numerous storage facilities without considering the particular implementation of each storage facility. In this context, the term datastore is used to refer to a generic data storage facility, whereas heterogeneous is used to indicate that the datastores need not be of the same type. A federated datastore is composed as an aggregation of several heterogeneous datastores configured dynamically by the application user.

Currently, the ability to search across many different types of datastores in many different geographical locations is achieved by the use of a federated datastore system, which provides mechanisms for conducting a federated multi-search and update across heterogeneous datastores. For example, each datastore may represent a company or division of a company. A division manager requires access to his or her local datastore but not to the datastores of other division managers. Conversely, a corporate officer may require access to the datastores of all the divisions, located, for example, in New York, San Francisco, London, and Hong Kong. A federated system is capable of searching all the databases, combining and aggregating the data into one report, and presenting the report to the corporate officer.

In a transparent, heterogeneous information integration environment such as a federated datastore system, query capability and semantics vary in each of the remote data sources. In such an environment with diverse remote data sources, conventional federated query compilers analyze query elements of a query statement in every user input query according to the capability and semantics of the remote data sources. The conventional federated query compilers determine which query elements can be evaluated remotely. If an element in the query is supported by the remote data source and also provides the same semantics in the remote data source as it does in the federated server, then the federated query compiler sends the query element to the remote data source through one or more remote queries. Such a query is capable of "pushdown" to the remote data source and is described as "pushdownable". The result set of the remote query is returned to the federated server for any further local processing. Query results are then returned to the user.

Although this approach to managing queries in a heterogeneous environment has proven to be useful, it would be desirable to present additional improvements. The method of conventional query compilers has improved query performance by sending part of the original user input SQL to the remote data source for evaluation. However, a query element sometimes cannot be included in a remote query (i.e., the query statement element is not "pushdownable") due to different capabilities or semantics in the remote data sources. In such a situation, the remote data source returns unfiltered data to the federated server. Consequently, the performance of such a query is poor because of the communication overhead required to transfer those non-qualifying rows from the remote data source to the federated server. Such communication overhead can be quite large when the size of the qualified data is small compared to the size of data returned without filtering from the remote data source.

What is therefore needed is a system, a computer program product, and an associated method for performing an inexact query transformation in a heterogeneous environment. The need for such a solution has heretofore remained unsatisfied.

SUMMARY OF THE INVENTION

The present invention satisfies this need, and presents a system, a computer program product, and an associated method (collectively referred to herein as "the system" or "the present system") for performing an inexact query transformation to provide more efficient query processing in a heterogeneous environment.

The present system selects a query element from a query statement. If an inexact transformation improves the performance of the selected query element, the present system selects and prioritizes candidate transformation rules applicable to the selected query element. The present system applies the candidate transformation rules to the selected query element to generate a transformed query element comprising a transformed remote query element (e.g., predicate) and a transformed local query element (e.g., predicate). The transformed query element may comprise a transformed remote predicate, a remote query operation, or other elements. The present system applies the candidate transformation rules to the selected query element to generate a transformed query element comprising a transformed remote element and a transformed local element.

If the transformed remote query element is pushdownable to one of the heterogeneous datastores, the present system adds the transformed remote query element to a transformed inexact query output. Otherwise, the present system applies additional candidate transformation rules to the selected query element to generate the transformed inexact query output for querying the heterogeneous datastore. The present system applies the transformed inexact query output to the heterogeneous datastore and applies the local query element to a query result returned from the heterogeneous datastore to provide a query result.

The present system may be embodied in a utility program such as an inexact query transformation utility program. The present system also provides a method for the user to provide a query statement input and then invoke the inexact query transformation utility to generate a transformed inexact query output for selectively querying the heterogeneous datastores in the federated system.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Datastore: The term datastore is a used to refer to a generic data storage facility, for example a relational database, flat file, etc.

Federation: A federated data system refers to a loosely coupled aggregation of several data servers, in which each data server can operate and function individually or participate in a federation with other data servers.

Heterogeneous datastores: Indicate that the datastores do not need to be of the same type, for example each datastore may be based on a different theory of data model, such as relational data model, Digital Library/Visual Info, or Domino Extended Search (DES).

Inexact Query Transformation: Transformation of a query, Q1, into another query, Q2, where query, Q2, will return a different result than query, Q1.

Pushdownable: A query statement or query element is pushdownable if it can be performed by a datastore.

Non-pushdownable: A query statement or query element is non-pushdownable if it cannot be performed by a datastore.

Remote: The term remote is used to distinguish a heterogeneous system or a heterogeneous datastore from a federated system; the heterogeneous system or heterogeneous datastore may be geographically distant or co-located with the federated system.

Figure 1:
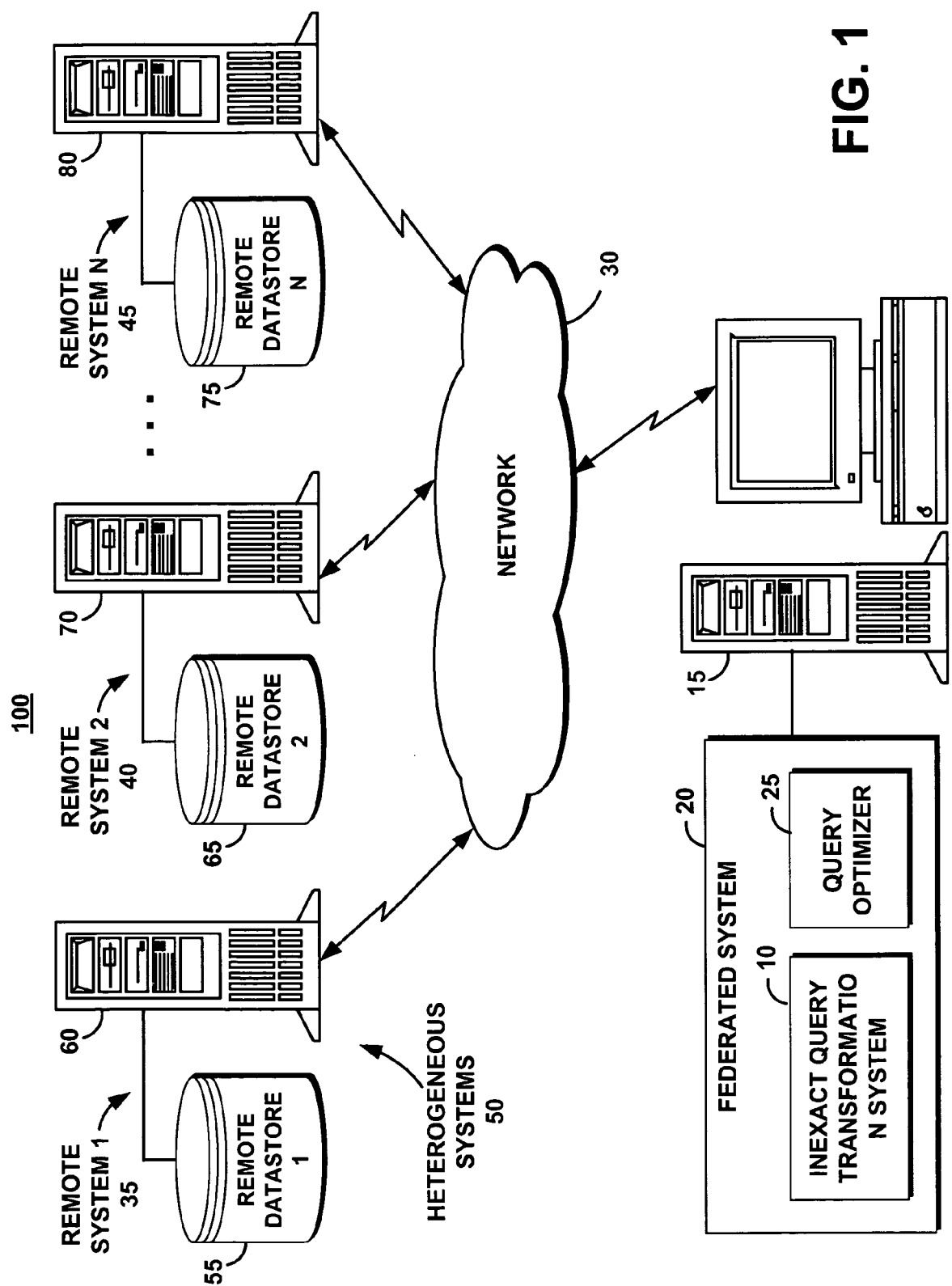
FIG. 1 is a schematic illustration of an exemplary operating environment in which an inexact query transformation system of the present invention can be used.

FIG. 1 portrays an exemplary overall environment in which a system, a service, a computer program product, and an associated method (the inexact query transformation system 10 or "the system 10") for performing an inexact query transformation in a heterogeneous environment (the heterogeneous environment 100) according to the present invention may be used. System 10 includes a software programming code or computer program product that is typically embedded within, or installed on a federated server 15. Alternatively, system 10 can be saved on a suitable storage medium such as a diskette, a CD, a hard drive, or like devices.

System 10 can take the form of an entirely hardware embodiment, an entirely software embodiment or an embodiment containing both hardware and software elements. In one embodiment, system 10 is implemented in software, which includes but is not limited to firmware, resident software, microcode, etc.

Furthermore, system 10 can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A federated system 20 comprises system 10 and a query optimizer 25. The federated system 20 queries via a network 30 heterogeneous datastore systems such as, for example, a remote system 1, 35, a remote system 2, 40, through a remote system N, 45 (collectively referenced as heterogeneous systems 50). The federated system 20 may additionally query one or more local systems (not shown).

The remote system 1, 35, comprises a remote datastore 1, 55, and a remote server 1, 60. The remote system 2, 40, comprises a remote datastore 2, 65, and a remote server 2, 70. The remote system N, 45, comprises a remote datastore N, 75, and a remote server N, 80. While described in terms of the heterogeneous systems 50, data may reside before being transmitted for evaluation in a data manager or index manager in a native database system. Furthermore, any one or more of the remote data sources may be non-relational data sources.

Figure 2:
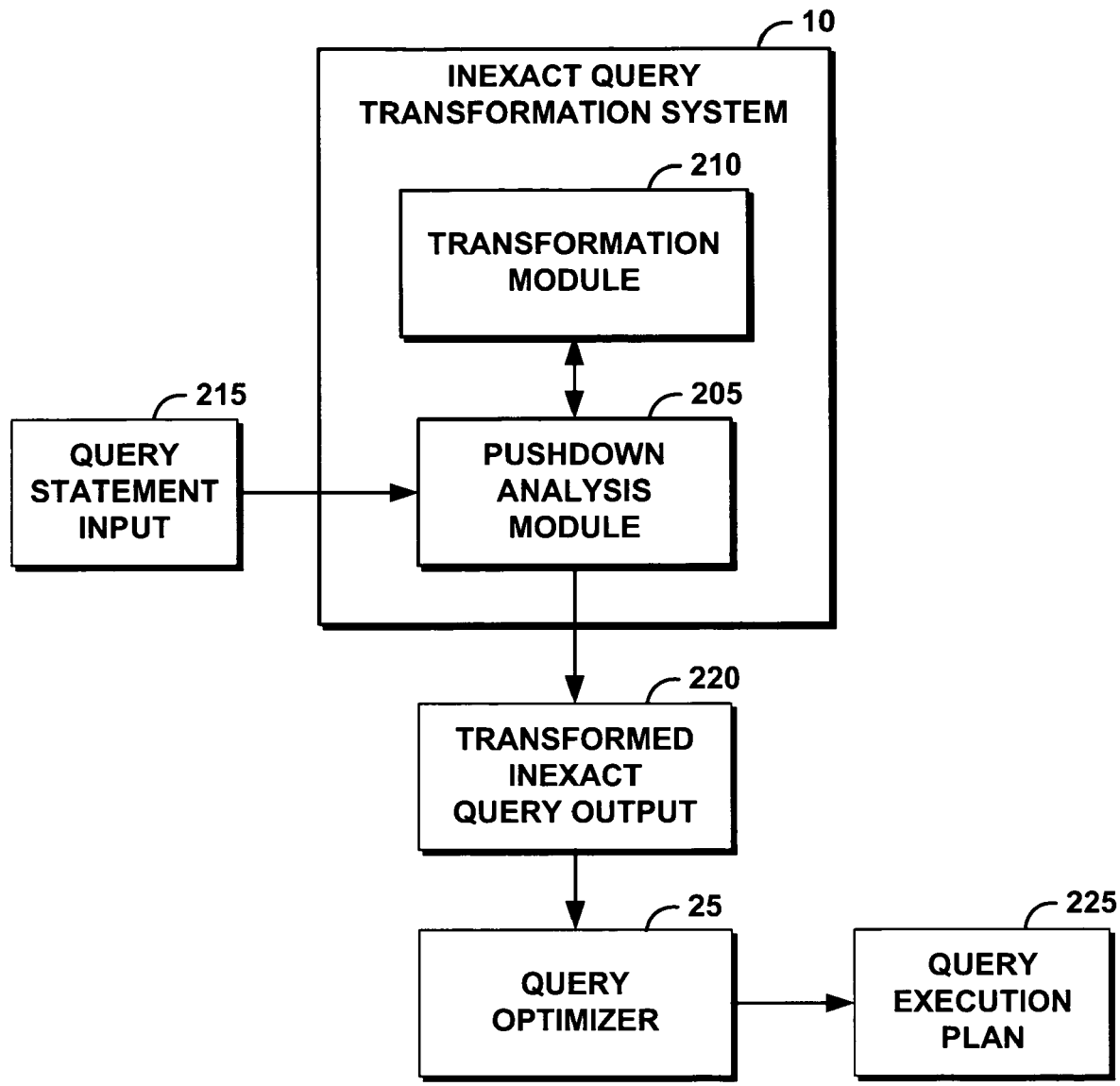
FIG. 2 is a block diagram of the high-level architecture of the inexact query transformation system of FIG. 1.

FIG. 2 illustrates a high-level hierarchy of system 10. System 10 comprises a pushdown analysis module 205 and a transformation module 210. Given a query statement input 215 comprising one or more query elements, system 10 generates a transformed inexact query statement output 220 from the query elements. The query optimizer 25 generates a query execution plan 225 from the transformed inexact query statement output 225 for one or more of the heterogeneous systems 50. The transformed inexact query statement output 225 is transformed by system 10 from the query statement input 215 to match query semantics or query capabilities of one or more of the heterogeneous systems 50.

For query elements that are non-pushdownable, system 10 provides filtering of data before data transmission from the heterogeneous systems 50 to the federated system 20. When a query element is non-pushdownable, an inexact transformation of the query element generated by system 10 can be used to filter data at the remote data source to produce a reduced-sized result set. System 10 targets such non-pushdownable query elements and generates inexact transformations to improve query performance in a heterogeneous environment.

Even when a query element in the query statement input 215 is pushdownable, evaluation of the query element may not result in the best performance for overall query processing. For example, one of the remote data sources 50 may not be able to use an index scan for the query element. In this case, system 10 examines one or more possible inexact transformations to improve query performance at the remote data sources 50. For example, a predicate of a query element can be rewritten to a semantically in-equivalent predicate that engages a remote index scan. Doing so can result in improved performance, especially when one or more of the remote data sources 50 do not have the capability to perform index scan if the original predicate has been used.

System 10 improves performance for processing of query statements by enabling inexact transformation. System 10 provides a phased filtering method to send one or more semantically in-equivalent queries to the heterogeneous systems 50 and achieve fast query processing in a transparent heterogeneous environment 100. Each query element of the query statement is transformed as necessary into a transformed query element comprising a transformed remote query element and a transformed local query element. The phased filtering method comprises applying the transformed remote query element to one or more of the remote datastores 50 and applying the transformed local query element to results returned from the remote datastores 50. The transformation of the query statement input 215 by system 10 can perform filtering and reduce the communication overhead or enable an improved access path selection (e.g., index access) at one or more of the heterogeneous systems 50.

System 10 further enables semantically inexact transformation that favors more efficient processing in the heterogeneous systems 50 without requiring equivalent query semantics. For example, when a non-indexable predicate cannot be rewritten to a semantically equivalent indexable predicate, system 10 rewrites the non-indexable predicate to a semantically inexact indexable remote query element that returns a slightly larger superset of the expected results in a significantly shorter time. Sending such a semantically inexact predicate to the remote data source results in improved performance, especially when the remote data source does not have the capability to perform inexact transformation.

Figure 3:
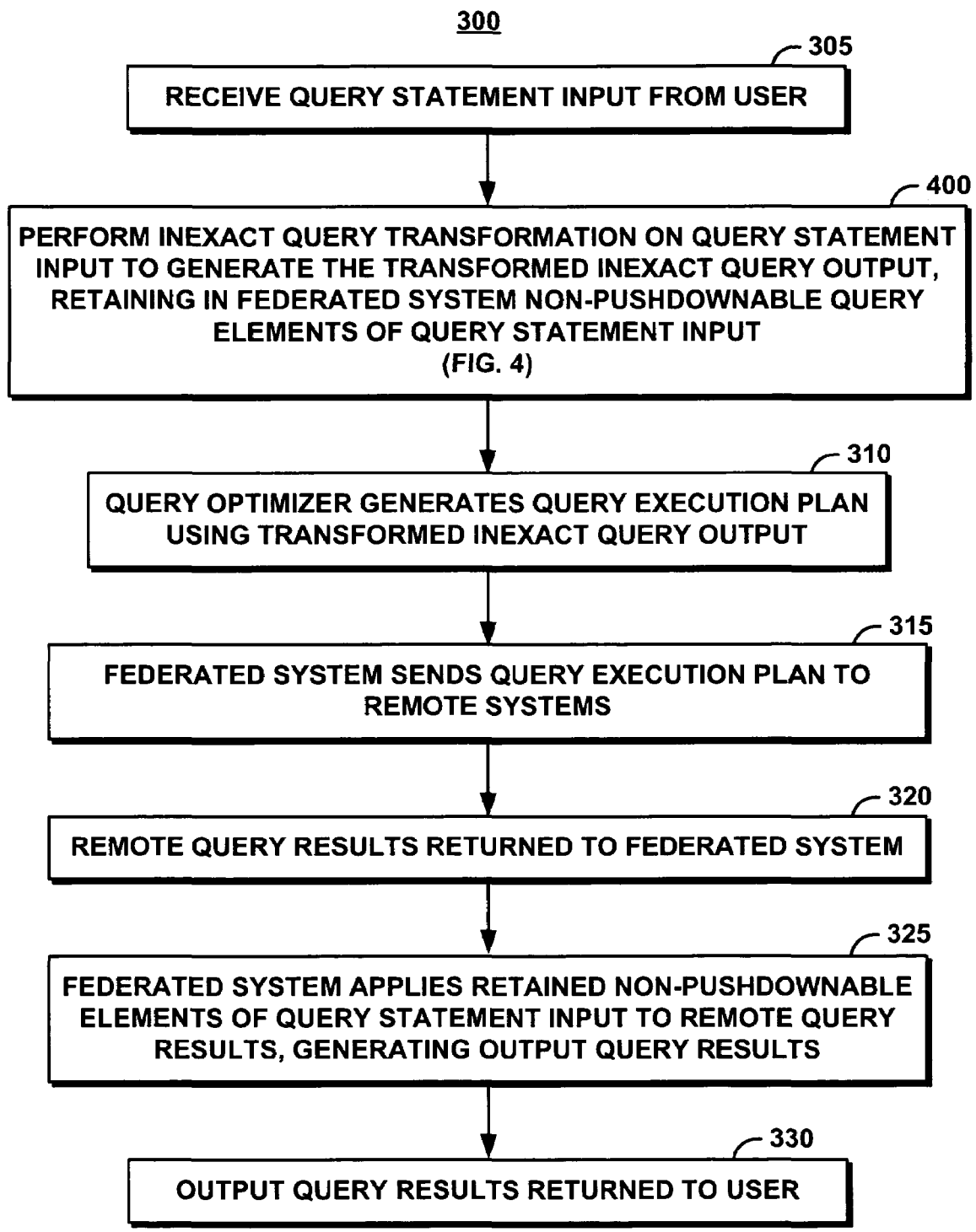
FIG. 3 is a process flow chart illustrating a method of operation of a federated system in executing a query statement using the inexact query transformation system of FIGS. 1 and 2.

FIG. 3 illustrates a method 300 of the federated system 20 in executing a query statement using system 10. The federated system 20 receives a query statement input 215 from a user (step 305). System 10 performs an inexact query transformation on the received query statement to generate the transformed inexact query output 220, retaining in the federated system 20 any non-pushdownable elements of the received query statement (step 400, FIG. 4).

The query optimizer 25 generates a query execution plan using the transformed inexact query output 220 (step 310).

The federated system 20 sends the query execution plan to one or more of the heterogeneous systems 50 (step 315). The one or more of the heterogeneous systems 50 return remote query results to the federated system 20 (step 320). The federated system 20 applies any retained non-pushdownable elements of the query statement input to the returned remote query results, generating output query results (step 325). The output query results are returned to the user (step 330).

The inexact query transformation mechanism of system 10 is implemented in the pushdown analysis module 205 that analyzes which query element can be evaluated remotely. In one embodiment, the pushdown analysis module 205 can be implemented in a query compiler of the federated system, for example, for relational nicknames. In another embodiment, the pushdown analysis module 205 can be implemented in a wrapper, for example, for non-relational nicknames.

Figure 4A:
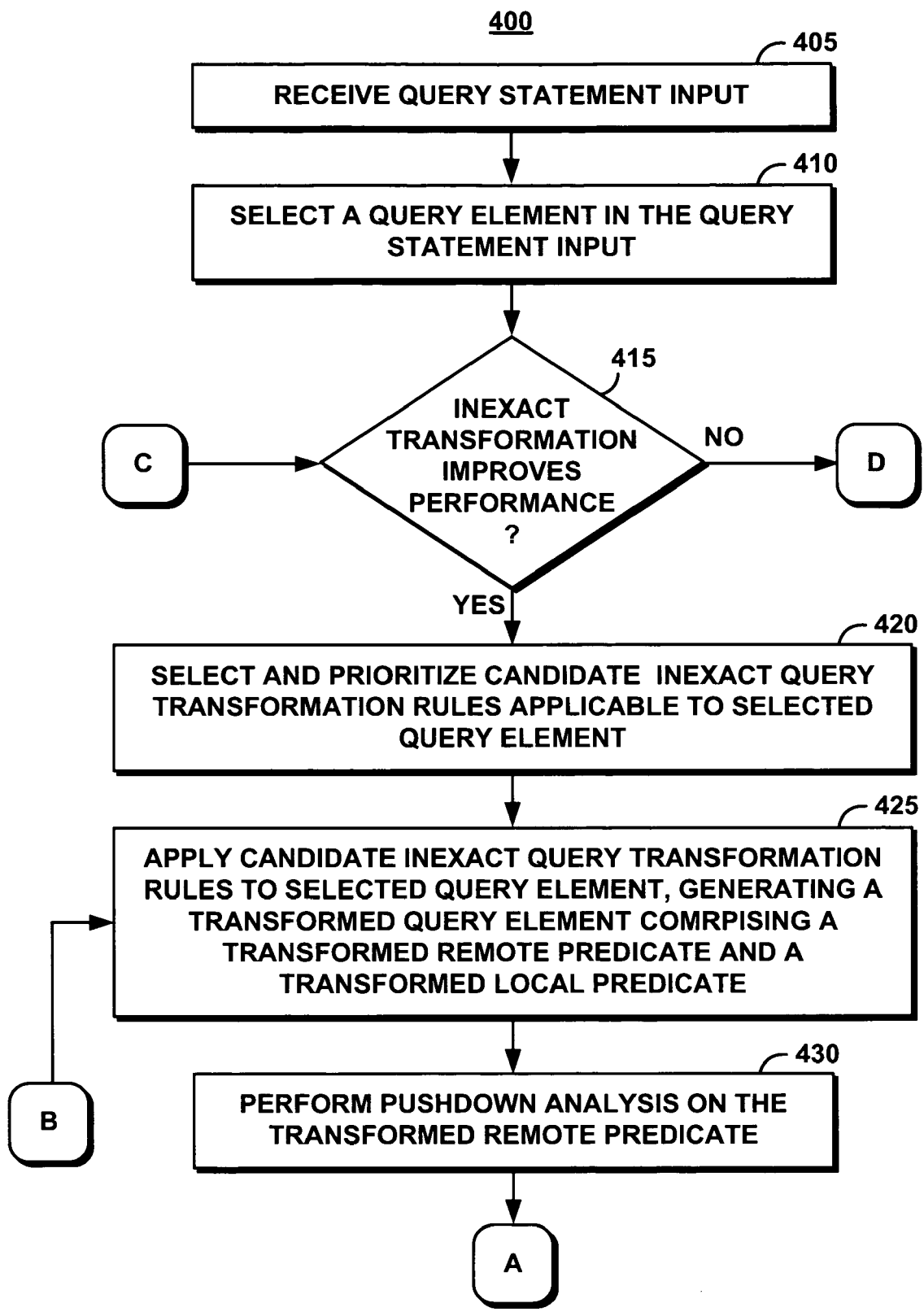
FIG. 4 is comprised of FIGS. 4A and 4B, and represents a process flow chart illustrating a method of operation of the inexact query transformation system of FIGS. 1 and 2.
Figure 4B:
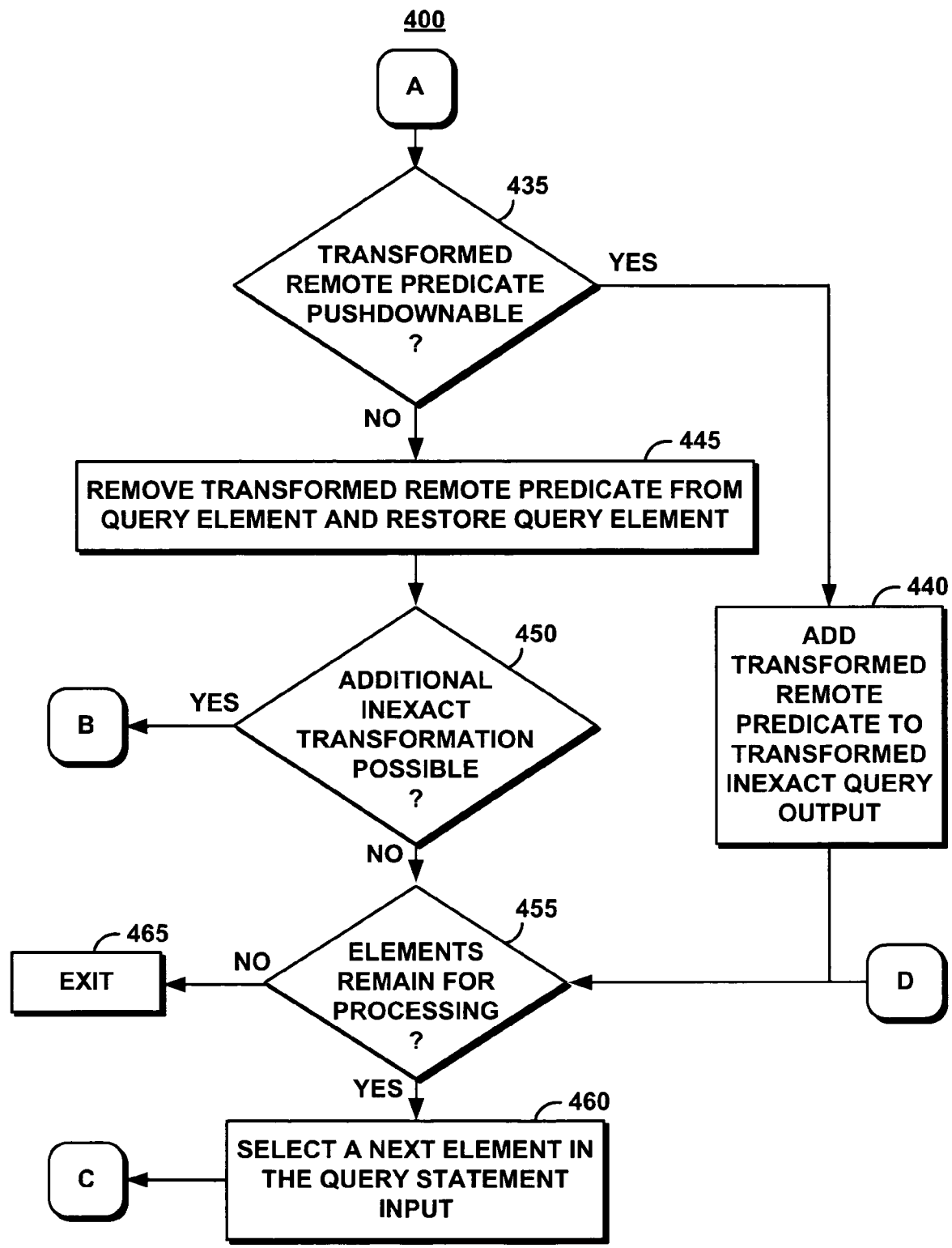

FIG. 4 (FIGS. 4A, 4B) illustrates a method 400 of system 10 in generating the transformed inexact query output 220 from the query statement input 215. The federated system 20 receives the query statement input 215 (step 405). The pushdown analysis module 205 selects a query element in the query statement input 215 (step 410). The pushdown analysis module 205 checks whether it is possible to perform inexact transformation to improve performance, based on a cost-based decision (decision step 415).

If the inexact transformation improves performance, the pushdown analysis module 205 selects and prioritizes candidate inexact query transformation rules applicable to the selected query element (step 420). Based on the priority order, the transformation module 210 applies the inexact query transformation rules to the selected query element, generating a transformed query element comprising a transformed local query element and a transformed remote query element (step 425).

The pushdown analysis module 205 performs a pushdown analysis on the transformed remote query element (step 430). The pushdown analysis module 205 determines whether the transformed remote query element is acceptable in one or more of the remote datasources 50 (decision step 435). If yes, the pushdown analysis module 205 adds the transformed remote query element to the transformed inexact query output 220 (step 440). Otherwise, the pushdown analysis module 205 removes the transformed remote query element from the query element and restores the query element (step 445).

The pushdown analysis module 205 determines if an additional inexact transformation is possible (decision step 450). If it is, processing returns to decision step 425. System 10 repeats steps 425 through 450 until a transformed remote query element is accepted and added to the transformed inexact query output (step 440) or until no additional inexact transformations are possible (decision step 450).

System 10 determines whether additional query elements remain for processing (decision step 455). If yes, the pushdown analysis module 205 selects a next query element (step 460) in the query statement input 215 and returns to decision step 415. If at decision step 415 an inexact transformation does not improve performance, the pushdown analysis module 205 proceeds to decision step 445. If no additional query elements remain for processing (decision step 455), system 10 exits processing (step 465).

System 10 generates a transformed inexact query output 220 to overcome performance hurdles imposed by a semantic difference between the federated system 20 and any of the heterogeneous systems 50. For example, one of the heterogeneous systems 50 such as remote system 1, 35, may use a case insensitive string comparison while the federated system 20 uses a case sensitive string comparison. Consequently, the federated system 20 cannot pushdown a comparison of character string data to the remote datastore 1, 55, of the remote system 1, 35.

An exemplary query statement input 215 for this example is:

```
SELECT e.name, e.salary
FROM employee e,
where e.name like 'Mike%'
and e.salary > 50,000
```

System 10 generates the transformed inexact query output 220 for this query statement input 215 as:

```
SELECT e.name, e.salary
FROM employee e
where e.name like 'Mike%'
and e.salary > 50,000;
```

A predicate set 1 {e.name like 'Mike %', and e.salary>50,000} returns reduced-sized result set, result_t1. Further local processing in the federated system 20 applies the following query (illustrated using SQL):

```
SELECT e.name, e.salary
FROM result_t1 e
WHERE e.name like 'Mike%'
```

A further example of a semantic difference between the federated system 20 and any of the heterogeneous systems 50 based on a case insensitive string comparison at one of the heterogeneous systems 50 such as remote system 1, 35, versus a case sensitive string comparison at the federated system 20 is as follows.

An exemplary query statement input 215 for this example is:

```
SELECT c1, COUNT(*)
FROM t1
GROUP BY c1;
```

System 10 generates the transformed inexact query output 220 for this query statement input 215 as:

```
SELECT c1, COUNT(*) as count_result
FROM t1
GROUP BY c1;
```

This transformed inexact query output 220 returns a reduced-sized result set, result_t1. Further local processing in the federated system 20 applies the following query (illustrated using SQL):

```
SELECT c1, SUM(count_result)
FROM result_t1
GROUP BY c1;
```

Yet another example of case insensitive string comparison a one of the heterogeneous systems 50 versus a case sensitive string comparison used as the federated system 20 follows. In this example, the federated system 20 cannot pushdown column functions on a comparison of character string data to the remote datastore 1, 55, of the remote system 1, 35.

An exemplary query statement input 215 for this example is:

```
SELECT Max(c2)
FROM t1
GROUP BY c1;
```

System 10 generates the transformed inexact query output 220 for this query statement input 215 as:

```
SELECT c2
FROM t1
WHERE c2 IN (SELECT max(c2) c2
             FROM t1
             WHERE c2 IS NOT NULL
             GROUP BY c1);
```

This transformed inexact query output 220 returns a reduced-sized result set, result_t1. Further local processing in the federated system 20 applies the following query (illustrated using SQL):

```
SELECT MAX (c2)
FROM result_t1
GROUP BY c1;
```

System 10 generates a transformed inexact query output 220 to overcome performance hurdles imposed by a capability difference between the federated system 20 and any of the heterogeneous systems 50. For example, one of the heterogeneous systems 50 such as remote system 1, 35, may allow one predicate per query and an IN list predicate allows at most 256 items while the federated system 20 allows a maximum number of 1024 IN list items. Consequently, the federated system 20 cannot pushdown a comparison of character string data to the remote datastore 1, 55 of the remote system 1, 35.

An exemplary query statement input 215 for this example is:

```
SELECT *
FROM nickname1
WHERE c1 IN
      (item_1,...item_x)
x>256
```

System 10 generates the transformed inexact query output 220 for this query statement input 215 as:

```
SELECT *
FROM remote_table1
WHERE c1 BETWEEN
      item_min AND item_max
```

The term $item_{max}$ is the maximal value of all the IN list items. The term $item_{min}$ is the minimal value of all the IN list items. This transformed inexact query output 220 returns a reduced-sized result set, result_t1. Further local processing in the federated system 20 applies the following query (illustrated using SQL):

```
SELECT *
FROM result_t1
WHERE c1 IN
      (item_1,...item_x)
```

As another example of capability difference between the federated system 20 and any of the heterogeneous systems 50, the remote system 1, 35, allows no expression in IS [NOT] NULL predicate while the federated system 20 allows expressions in IS [NOT] NULL predicate and allows overflow results in NULL.

An exemplary query statement input 215 for this example is:

```
SELECT *
FROM nickname1
WHERE c1*c2 IS NOT NULL
```

Suppose c1*c2 may overflow. System 10 generates the transformed inexact query output 220 for this query statement input 215 as:

```
SELECT *
FROM remote_table1
WHERE c1 IS NOT NULL and c2 IS NOT NULL
```

This transformed inexact query output 220 returns a reduced-sized result set, result_t1. Further local processing in the federated system 20 applies the following query (illustrated using SQL):

```
SELECT *
FROM result_t1
WHERE c1*c2 IS NOT NULL
```

System 10 generates a transformed inexact query output 220 to improve query performance by taking advantage of an index capability in one of the remote data systems 50 such as remote system 1, 35. An index exists on character string column 1 in the remote datastore 1, 55, of the remote system 1, 35. The remote datastore 1, 55, does not support a LIKE predicate and thus cannot use an index scan for a LIKE predicate, but can use an index scan for a BETWEEN predicate. As used herein, the term "remote" does not literally mean physically remote. Rather, a "remote layer" is a layer that is closer to the source data. The inexact transformation generated index predicate that returns a superset of the result and the non-indexable predicate that returns exact result are examples of a remote layer and an inexact transformation, respectively.

An exemplary query statement input 215 for this example is:

```
SELECT *
FROM nickname1
WHERE c1 LIKE 'IBM%DB2';
```

System 10 generates the transformed inexact query output 220 for this query statement input 215 as:

```
SELECT *
FROM remote_table1
WHERE c1 BETWEEN 'IBM' AND IBMmax
```

The term IBMmax is a string that starts with 'IBM' and is padded with maximal character point in the remote collating sequence. This transformed inexact query output 220 returns a reduced-sized result set, result_t1. Further local processing in the federated system 20 applies the following query (illustrated using SQL):

```
SELECT *
FROM result_t1
WHERE c1 LIKE 'IBM%DB2';
or
SELECT *
FROM result_t1
WHERE c1 LIKE '%DB2';
```

In another example of system 10 taking advantage of index capability in one of the heterogeneous systems 50, an index exists on character string column 1 in the remote datastore 1, 55, of the remote system 1, 35. The remote datastore 1, 55, does support a LIKE predicate but cannot use an index scan for a LIKE predicate. The remote datastore 1, 55, can use an index scan for a BETWEEN predicate.

An exemplary query statement input 215 for this example is:

```
SELECT *
FROM nickname1
WHERE c1 LIKE 'IBM%DB2';
```

System 10 generates the transformed inexact query output 220 for this query statement input 215 as:

```
SELECT *
FROM remote_table1
WHERE (c1 BETWEEN 'IBM' AND IBMmax) AND (c1 LIKE '%DB2')
```

The term IBMmax is a string that starts with 'IBM' and is padded with maximal character points in the remote collating sequence. The term '% DB2' is used here to illustrate the remote query element does not have to be the same as the original predicate. No further local processing in the federated system 20 is required.

System 10 improves the performance of the queries in the heterogeneous environment 100 by taking full advantage of capabilities of the heterogeneous systems 50, reducing the amount of data transferred through network, thereby reducing communication cost and reducing local processing cost of the federated system 20. The method of system 10 can be extended to any systems where data filtering can occur before data is passed. For example, such systems comprise native database systems. Further, a database server of any of the heterogeneous systems 50 can use SARGable predicates to reduce the number of rows passed internally to the next stage. When there are no SARGable predicates in the original query statement or after equivalent transformation, inexact transformation performed by system 10 can generate SARGable predicates and return a reduced-sized superset of results to the federated system 20.

It is to be understood that the specific embodiments of the invention that have been described are merely illustrative of certain applications of the principle of the present invention. Numerous modifications may be made to the system and method for performing an inexact query transformation in a heterogeneous environment described herein without departing from the spirit and scope of the present invention. Moreover, while the present invention is described for illustration purpose only in relation to the structured query language (SQL), it should be clear that the invention is applicable as well to, for example, to any structured or semi-structure query language.

What is claimed is:

1. A processor-implemented method of performing an inexact query transformation in a heterogeneous environment including a plurality of heterogeneous datastores, the method comprising:

selecting a query element from a query statement;

determining whether an inexact transformation improves a performance of the query statement;

in response to determining that the inexact transformation improves the performance of the query statement, selecting a plurality of candidate transformation rules applicable to the selected query element;

prioritizing the selected candidate transformation rules;

applying the prioritized candidate transformation rules to the selected query element to generate a transformed query element comprising a transformed remote query element and a transformed local query element;

if the transformed remote query element is not pushdownable to at least one heterogeneous datastore of the heterogeneous datastores, wherein the query element is pushdownable if the query element can be evaluated by the at least one heterogeneous datastore, determining whether additional inexact transformations are possible; and if additional inexact transformations are possible, repeatedly applying additional candidate transformation rules to the selected query element to generate another transformed query element comprising a transformed remote query element and a transformed local query element and performing pushdown analysis on this transformed remote query element until the transformed remote query element determined to be pushdownable or until no additional inexact transformations are possible;

if the transformed remote query element is pushdownable to at least one heterogeneous datastore of the heterogeneous datastores,
adding the transformed remote query element to a transformed inexact query output;
applying the transformed inexact query output to the heterogeneous datastore; and
applying the transformed local query element to a query result returned from the heterogeneous datastore to provide a final query result.

2. The method of claim 1, wherein the transformed query element comprises a remote query predicate.

3. The method of claim 1, wherein the transformed query element comprises a remote query operation.

4. The method of claim 1, wherein the transformed local query element further comprises a transformed local predicate.

* * * * *